Figure 1:
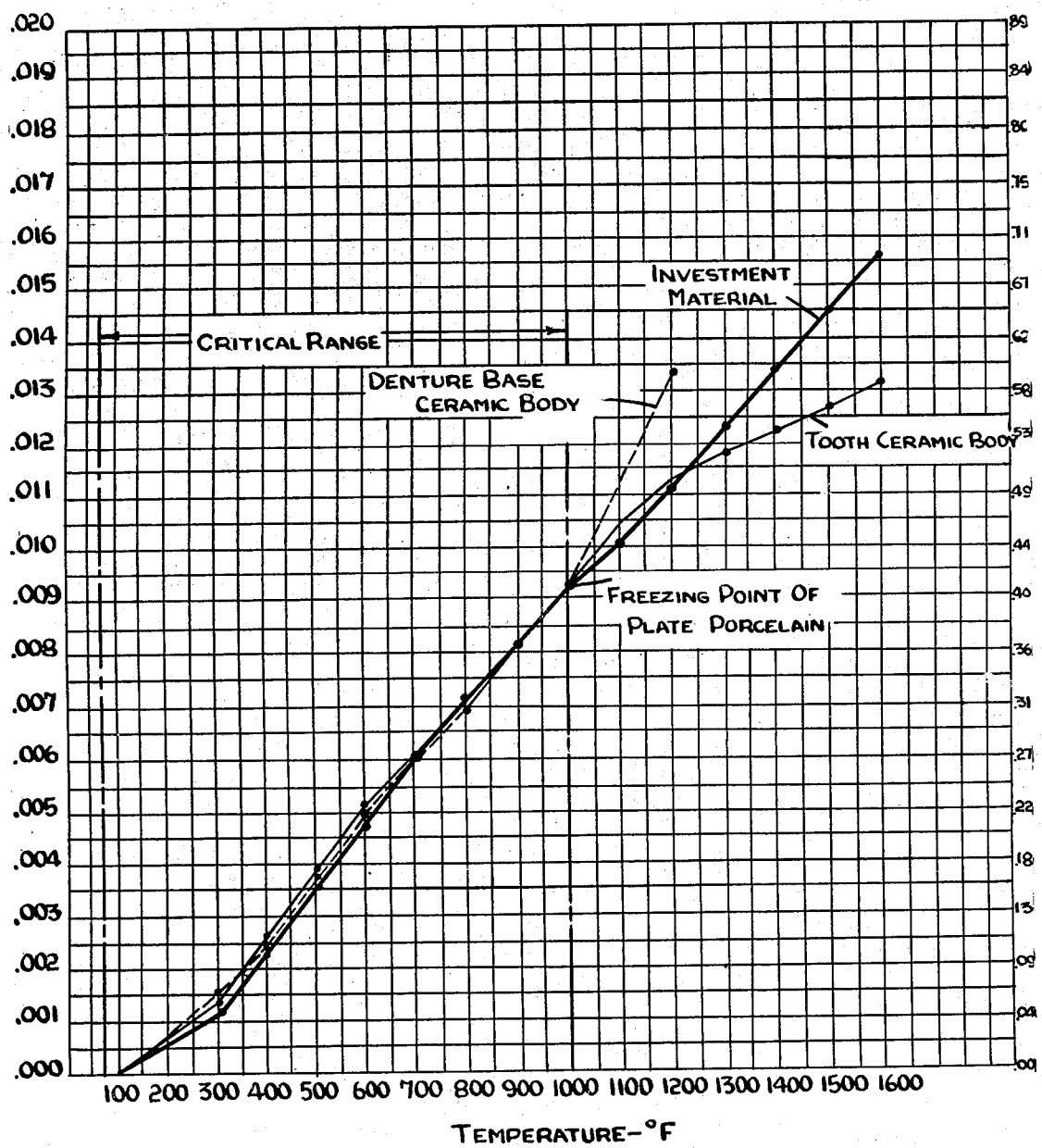

Patented Aug. 25, 1942

2,293,909

UNITED STATES PATENT OFFICE 2,293,909

METHOD OF FORMING ALL CERAMIC DENTURE

Pyungtoo William Lee and Charles Dietz, York, Pa., assignors to The Dentists' Supply Company of New York, New York, N. Y., a corporation of New York Original application May 31, 1939, Serial No. 276,644. Divided and this application March 20, 1940, Serial No. 324,986

4 Claims. (Cl. 18—55.1)

This invention relates to an all ceramic denture, and has particular reference to the method of manufacturing such a denture wherein the teeth and denture base form an integral unit.

This application is a division of our co-pending application filed May 31, 1939, Serial No. 276,644.

In the dental art, the molding or attaching of teeth of one ceramic body to another of different composition and at a temperature lower than the fusing temperature of the higher fusing body has not been successful up to date, although the theory has been advanced and much claim has been made in dental literature and in patent specifications. Claims have been based on the assumption that two different bodies of like coefficients of expansion and contraction could be made or developed, but in practice no one heretofore has been able to produce two such different bodies of different compositions whose coefficients of expansion and contraction are alike, at least, through the critical range from atmospheric temperature to the plastic stage of the lower fusing material, and from that plastic temperature to atmospheric temperature.

It has been found in practice that if the difference in the linear expansion and contraction of two ceramic bodies is greater than one-tenth of one per cent at any point between the plastic stage of the lower fusing body and room temperature, the two bodies cannot be attached or molded together without producing checks and cracks in either one or the other of the bodies.

The object, therefore, of the present invention is to provide a method whereby to produce an integral ceramic unit from two ceramic bodies having widely diverging fusing temperatures.

A further object of the invention is to provide a method of producing a denture having the teeth and base formed in an integral unit, in which the ceramic body of the teeth has a higher fusing temperature, and the ceramic body of the base has a relatively low fusing temperature.

A still further object of the invention is to provide a method for fusing into an integral unit two ceramic bodies, having widely different fusing temperatures, without resulting checks, cracks, etc.

According to the invention, the novel method of forming an integral all-ceramic denture comprises the steps of fusing a denture base ceramic body to artificial teeth in an investment material which forms said denture base and whose linear thermal contraction through the critical range will vary less than one-tenth of one per cent from that of said teeth and/or denture base.

The teeth may be made of ceramic body fusible at a substantially high temperature, and the denture base ceramic body fusible at relatively lower temperature. These ceramic bodies are then fused to form an integral unit in material whose thermal contraction through the critical range is in harmony with that of said teeth ceramic body and base ceramic body.

Figure 2:
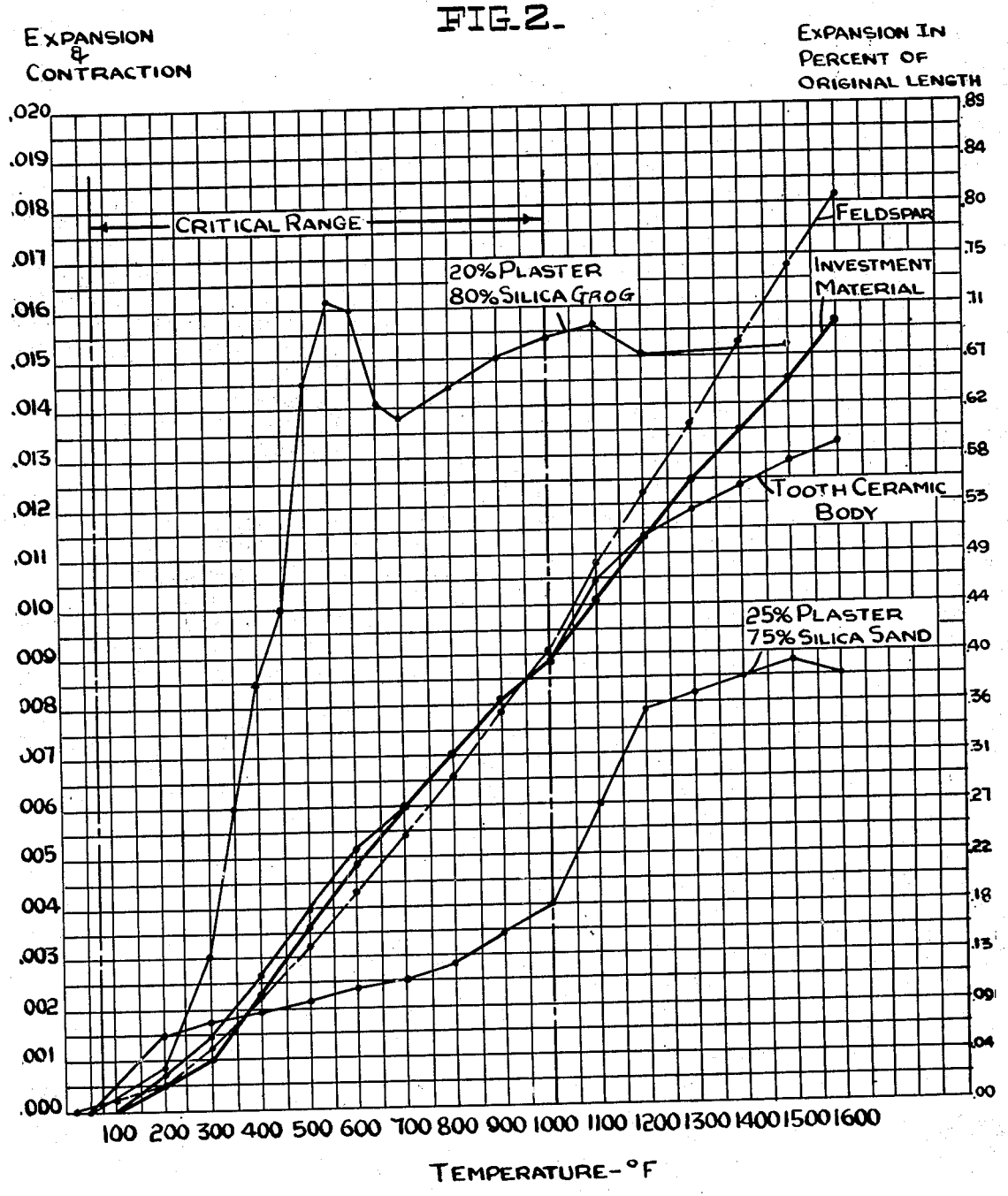
Figure 3:
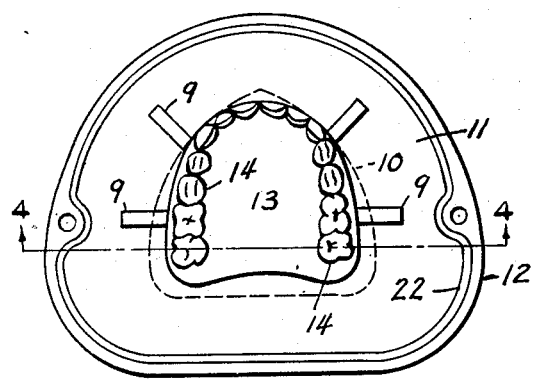
Figure 6:
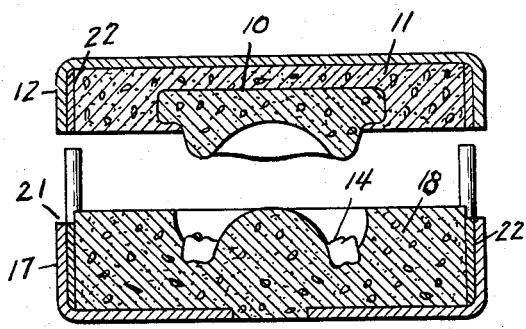
Figure 4:
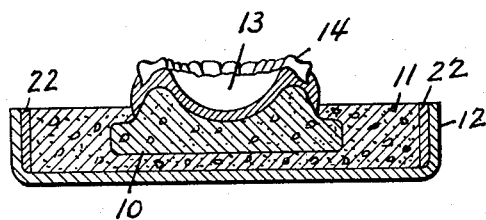
Figure 7:
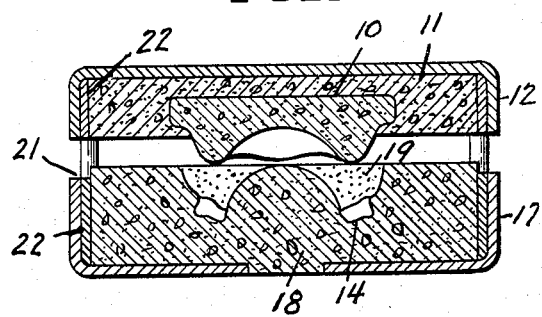
Figure 5:
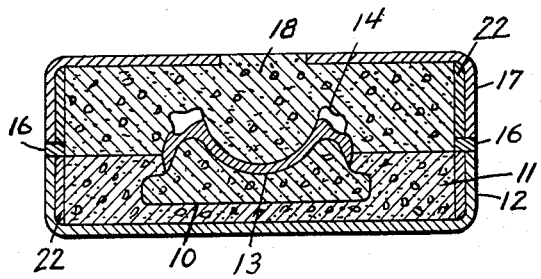
Figure 8:
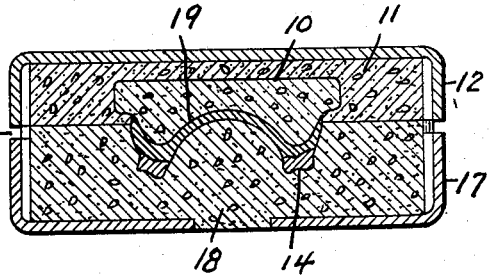

The drawings illustrate an exemplification of the method employed and the views therein are as follows:

Figure 1 is a graph sheet having as abscissae degrees of temperature in Fahrenheit scale, and as ordinates linear expansion graded in thousandths of an inch, the thermal expansion of specimens 2.250" of the novel tooth ceramic body, the novel denture ceramic body and the novel investment material have been graphically plotted from readings indicated by a dial gauge which is graduated in ten-thousandths of an inch. The corresponding percentages of expansion are also given, Figure 2 is a similar sheet and depicts the thermal expansion curves of two commercial investment materials of general use, ordinary feldspar, the novel investment material, and the novel tooth ceramic material, Figure 3 is a plan view of a denture base model invested in one half of an investment flask and shows a temporary denture base with teeth attached applied to said model, Figure 4 is a cross-sectional view on the lines 4—4 of Figure 3, Figure 5 is a like view showing the other half of the flask applied and the temporary denture base with teeth invested therein, Figure 6 is a similar view showing the flask inverted and separated and the temporary denture base removed, Figure 7 is a like view showing the novel denture base ceramic body residing in the space formerly occupied by the temporary denture base, and the flask parts re-united, and Figure 8 is a like view showing the relation of parts after fusion of the denture base ceramic body.

To accomplish all the objects hereinbefore set forth, it is necessary to provide ceramic bodies and investment material whose curves of expansion and contraction through certain ranges are harmonious. Nothing found in the prior art will accomplish the results in order to fulfill the foregoing objects.

After providing a ceramic body for the teeth with a suitable expansion and contraction curve, it was then necessary to provide a ceramic body for the denture base with a substantially identical expansion and contraction curve and also to provide an investment material whose expansion and contraction curve was in substantial harmony with those of the tooth and denture base ceramic bodies.

The teeth used in this method are, therefore, commercial artificial porcelain teeth fired at or about 2400° F. The expansion and contraction of the ceramic body of the tooth have been accurately determined and measured between atmospheric temperature and the softening temperature thereof.

In Figure 1, the thermal expansion and contraction curve for the tooth ceramic body is shown by a full light line, and marked "Tooth ceramic body." The common and principal ingredients from which artificial porcelain teeth are usually produced are feldspar, kaolin and silica. Their proportions may differ.

As a ceramic body for the artificial teeth giving the thermal expansion and contraction curve shown in Figure 1, we have devised a formula as follows:

| | Per cent |
|---|---|
| Feldspar | 70 to 90 |
| Amorphous silica | 10 to 30 |

The teeth of this ceramic body may be manufactured either for general commercial use containing the usual dental pins, either of base or precious metal, or may be provided with other means for fastening them to usual and ordinary denture bases. For the purpose of this invention, all such fastening devices may be eliminated, and we shall hereafter refer to teeth without any of these fastening devices as "bare teeth."

The denture base ceramic body of this invention is compounded in such a way that its thermal expansion and contraction are substantially harmonious with the thermal expansion and contraction of the porcelain of the teeth. This is especially so through the critical range which comprises from atmospheric temperature up to the fusing temperature of the denture base ceramic body, or vice versa. It is especially important that the contraction curve be in agreement from the softening point of the denture base material down through the hardening range to room temperature in order that no cracking may occur, and in order that a perfect union between the two ceramic bodies may be effected.

The softening, maturing or fusing point of the denture base material may be considerably lower than the fusing point of the tooth material. In the present invention, the fusing point of the tooth material may be from approximately 2300° to 2400° F., while the fusing point of the denture base material may be from approximately 1500° to 1600° F. Consequently, the ceramic body of which the teeth are made may be termed a high fusing dental porcelain, while the ceramic body of which the denture plate or base is made is between porcelain and glass, probably being closer to glass than to porcelain. The denture base ceramic body which has been developed, and which produces a thermal expansion and contraction curve, such as that marked in Figure 1 of the drawings "Denture base ceramic body," has the following formula:

| | Per cent |
|---|---|
| Feldspar | 65 to 80 |
| Amorphous silica | 10 to 20 |
| Borax glass | 5 to 15 |

In the ceramic bodies of both the tooth and denture base we have utilized amorphous silica for the following reasons:

1. It produces a low coefficient of expansion and contraction;
2. Its substitution for regular silica lowers the maturing or fusing temperature of the bodies;
3. It eliminates the silica inversions, thereby producing a curve nearer to a straight line;
4. Because of its very fine particle size, it can be more easily and uniformly mixed in the bodies and lowers their fusing temperatures.
5. It produces stronger bodies.

Under proper control of temperature and time of firing, the tooth and denture base ceramic bodies of the foregoing formulae will expand and contract in substantial harmony. (See Fig. 1.)

In carrying out the process of forming our improved denture the teeth are molded and fired in the usual way. A model 10, made from the novel investment material and exactly duplicating in size and form the area to be covered by the denture base is cast, and this is invested in the novel investment material 11 in the usual manner in the lower half 12 of a flask. Suitable escapeways 9, as usually provided, may also be provided in carrying out this process. On this model 10 is a temporary denture base 13 composed of material which can be readily melted and which has the artificial teeth 14 set therein. This temporary denture base 13 is identical in form with the permanent denture base to be procured. (See Figs. 3 and 4.) The upper half of the flask then has a gasket 16 placed on its upstanding peripheral edge, and the lower half 12 of the flask separated from the upper half by this gasket. Investment material 18, identical with the material 11 and with the material of the model 10, is then poured in through openings in the top of the upper half 17 of the flask until the same is completely filled. (See Fig. 5.) After the investment material in the upper half has set or hardened so as to secure the artificial teeth therein the flask may be inverted, boiled or heated, separated, and the temporary denture base melted or washed out. This also removes the material from the escapeways 9. (See Fig. 6.) The gasket 16, which formerly separated the halves of the flask, is then removed and the novel ceramic body 19 of the denture base filled into the space formerly occupied by the temporary denture base 13. The halves of the flask are then re-united. The flask is now ready for final processing to form the all ceramic denture by fusing the denture base ceramic body to the teeth.

In addition to the technical difficulty of developing a high fusing tooth ceramic body and a low fusing base ceramic body, which are in substantial harmony in expansion and contraction, certain practical advantages are obtained by having the denture base ceramic body fused around 700 to 800° F. lower than the tooth ceramic body. There is no danger of the vitrified teeth being deformed by a heat too close to their softening temperature. The temperature cited will not affect stains or other markings placed on the face of the teeth to achieve certain artistic effects. The type of investment used to form the denture plates need not be excessively high fusing. Because this required temperature is comparatively low, the furnace for fusing the plate ceramic body to the teeth need not be intricate or expensive. The metal flask, just above described, in which the fusing is accomplished, may be made from several inexpensive alloys which will withstand a temperature of 1600° F. or more.

Before placing investment material in either section of the flask, the side walls of the same have been lined with material 22 which will burn out, compress or otherwise allow for the expansion of the investment material, as shown and described in United States Letters Patent 2,228,059 issued to Pyungtoo William Lee, one of the applicants herein, on January 7, 1941.

In order to make the denture exactly fit the particular mouth for which it is designed, the denture base ceramic body must be formed while plastic over an exact model of that particular mouth. This is the model shown in Figures 3 to 8 of the drawings, and must be made of an investment composition which has a thermal expansion and contraction in practical agreement and harmony with the expansion and contraction of both the tooth ceramic body and denture base or plate ceramic body, in order that no checking or fracturing of the teeth or plate shall occur in the cooling process.

Dental investment compositions generally contain a considerable portion of quick setting material, such as gypsum or plaster of Paris, together with silicious materials, such as silica-sand and fire clay grog.

In the drawings, Figure 2 shows a thermal expansion curve of an investment material having 20% plaster of Paris and 80% silica grog. That same figure shows another thermal expansion curve of an investment material having 25% plaster of Paris and 75% silica-sand. The thermal expansion curve of gypsum-silica mixtures, as shown, is generally characterized by certain sharp breaks due to silica inversions and to dehydration of the sulphate. It has been shown in Figure 1 that the thermal expansion and contraction curves of the new tooth ceramic body and of the new denture base ceramic body have been brought into practical conformity, whereas the curves of the commercial investment materials, shown in Figure 2, are widely divergent from the curves of the tooth and base ceramic materials, the former of which is also shown in Figure 2. A denture base formed in investments, such as those indicated as "commercial," would be badly cracked when cooled.

We have found that feldspar has a very uniform curve of expansion. A thermal expansion and contraction curve of feldspar is shown in Figure 2. We have further found that an investment compound of the following general proportions will give a thermal expansion and contraction curve in substantial harmony with the curves of the tooth and denture base ceramic bodies hereinbefore described. The formula for this new investment material is as follows:

| | Per cent |
|---|---|
| A form of calcium sulphate (Hydrocal) | 10 to 25 |
| Feldspar | 30 to 80 |
| Silica grog | 10 to 45 |

The thermal expansion and contraction curve of this investment material is shown in Figures 1 and 2.

In Figure 2, we, therefore, find that through the critical range, which we have before discussed, the thermal expansion and contraction curves of the tooth ceramic body, the denture base ceramic body and the investment material are always controlled so as to vary one from the other less than one-tenth of one per cent.

After the denture base ceramic body 19 has been placed in the recess formerly occupied by the temporary denture base and the flask sections re-united, the flask is then placed in a kiln and the temperature gradually raised to the softening temperature of the denture base ceramic body, whereupon pressure is preferably added to the top of the flask to accelerate the coming together of the sections of the flask (see Figure 8). This may be accomplished by merely placing a weight of a few pounds on the upper flask section. It, of course, will be readily seen that the upper part of the flask will, by its weight or by gravity, come into contact with the lower part of the flask when the denture base ceramic body becomes soft, but the weight will hasten that step and allow for cutting off the heat to the kiln. By adding the weight or pressure to the upper part of the flask, we, therefore, accomplish the following objects:

1. Economize in fuel;
2. Save time;
3. Prevent the temperature from going beyond the necessary temperature to soften the denture base ceramic body.

Dentures made according to the foregoing description, and with the given formulae, have been produced over a period of time, and the process herein described has proven to be substantially one hundred per cent perfect. Care has been taken to make no unjust claims, and to be thoroughly convinced of the practicability of the process, the harmonious thermal expansion and contraction of the tooth ceramic body, the denture base ceramic body and the investment material, and the fit and comfort of the resulting dentures, before the filing of an application for patent thereon.

The invention has many advantages. Among these are—

(a) The teeth and denture base comprise an integral unitary structure;

(b) Bare teeth may be used without metal or any other form of anchorage;

(c) Partial plates may be made;

(d) The natural gum pink color of the denture plate is non-fading;

(e) The denture plate is not subject to warpage or to change of form found in vulcanite plates and in synthetic resin plates;

(f) The denture itself will not permit infiltration of the acids of the mouth. It is, therefore, always clean, free from odors, etc.;

(g) Ceramic material denture bases are kind to the oral tissues and have a pleasantly cool feeling. The mat finish of this denture base ceramic body lends itself to a better adaption and fitting to the oral tissues;

(h) Eliminates the danger of teeth dropping from the denture base as in other types of denture base.

Of course, the process of making all ceramic dentures may be modified and changed in various ways without departing from the invention hereinbefore set forth and described in the appended claims.

The invention is hereby claimed as follows:

1. The herein described method of forming an integral all-ceramic denture in a two-part flask, said method comprising the steps of first forming from suitable investment material a dental model, then placing thereon a temporary denture base having teeth fusible at substantially high temperature, then investing said model and temporary denture in one part of the flask, then combining the flask parts and supplying investment material to the other flask part to invest the teeth therein, then separating the flask parts, then removing said temporary denture base by applying heat, then inserting in the resulting cavity of the flask part containing the teeth a predetermined quantity of denture base ceramic material sufficient to initially maintain the flask parts slightly spaced when assembled and having a fusing temperature substantially lower than that of said teeth, then applying the other flask part, whereby the assembled flask parts will be disposed in slightly spaced relation, and then applying heat and pressure until the flask parts meet and the base and teeth are fused into an integral unit.

2. The herein described method of forming an integral all-ceramic denture in a two-part flask, said method comprising the steps of first forming from suitable investment material a dental model, then placing thereon a temporary denture base having teeth fusible at substantially high temperature, then investing said model and temporary denture in one part of the flask, then combining the flask parts and supplying investment material to the other flask part to invest the teeth therein, then separating the flask parts, then removing said temporary denture base by applying heat, then inserting in the resulting cavity of the flask part containing the teeth a predetermined quantity of denture base ceramic material sufficient to initially maintain the flask parts slightly spaced when assembled and having a fusing temperature substantially lower than that of said teeth, then applying the other flask part, whereby the assembled flask parts will be disposed in slightly spaced relation, and then heating the assembled flask parts to the fusing temperature of the denture base ceramic material and applying pressure to close the flask and fuse the base and teeth into an integral unit.

3. The herein described method of forming an integral all-ceramic denture in a two-part flask, said method comprising the steps of first forming from suitable investment material a dental model, then placing thereon a temporary denture base having teeth fusible at substantially high temperature, then investing said model and temporary denture in one part of the flask, then combining the flask parts and supplying investment material to the other flask part to invest the teeth therein, then separating the flask parts, then removing said temporary denture base by applying heat, then inserting in the resulting cavity of the flask part containing the teeth a predetermined quantity of granular denture base ceramic material sufficient to initially maintain the flask parts slightly spaced when assembled and having a fusing temperature substantially lower than that of said teeth, then applying the other flask part, whereby the assembled flask parts will be disposed in slightly spaced relation, and then applying heat and pressure until the flask parts are in engaged relation and the base and teeth are fused into an integral unit.

4. The herein described method of forming an all-ceramic denture, comprising the steps of providing a two-part flask for forming a denture, one part of said flask containing pre-fired porcelain teeth with a fusing temperature higher than that of the ceramic denture base material, inserting in the flask part containing the teeth a predetermined weight of ceramic denture base material sufficient to initially maintain the flask parts slightly spaced when assembled, applying the second flask part, whereby the assembled flask parts will be separated by the ceramic denture base material, and then applying heat and pressure until the ceramic denture base material contracts and vitrifies and the flask parts meet.

PYUNGTOO WILLIAM LEE.
CHARLES DIETZ.